Figure 1:
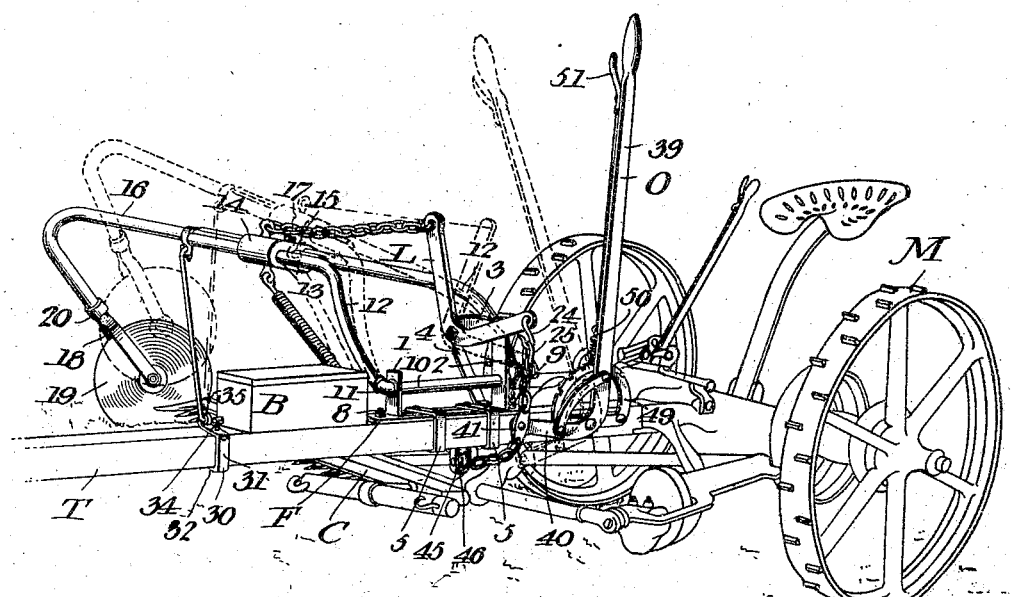

No. 785,173. PATENTED MAR. 21, 1905.
J. G. KING.
VINE CUTTING ATTACHMENT FOR MOWING MACHINES.
APPLICATION FILED AUG. 6, 1904.

4 SHEETS—SHEET 1.

Witnesses
E. F. Stewart
Wm. Ragger

John G. King, Inventor.
by C. A. Snow & Co.
Attorneys

No. 785,173. PATENTED MAR. 21, 1905.
J. G. KING.
VINE CUTTING ATTACHMENT FOR MOWING MACHINES.
APPLICATION FILED AUG. 6, 1904.

4 SHEETS—SHEET 2.

Witnesses
E. F. Stewart
Wm. Bagger

John G. King, Inventor,
by C. A. Snow & Co,
Attorneys

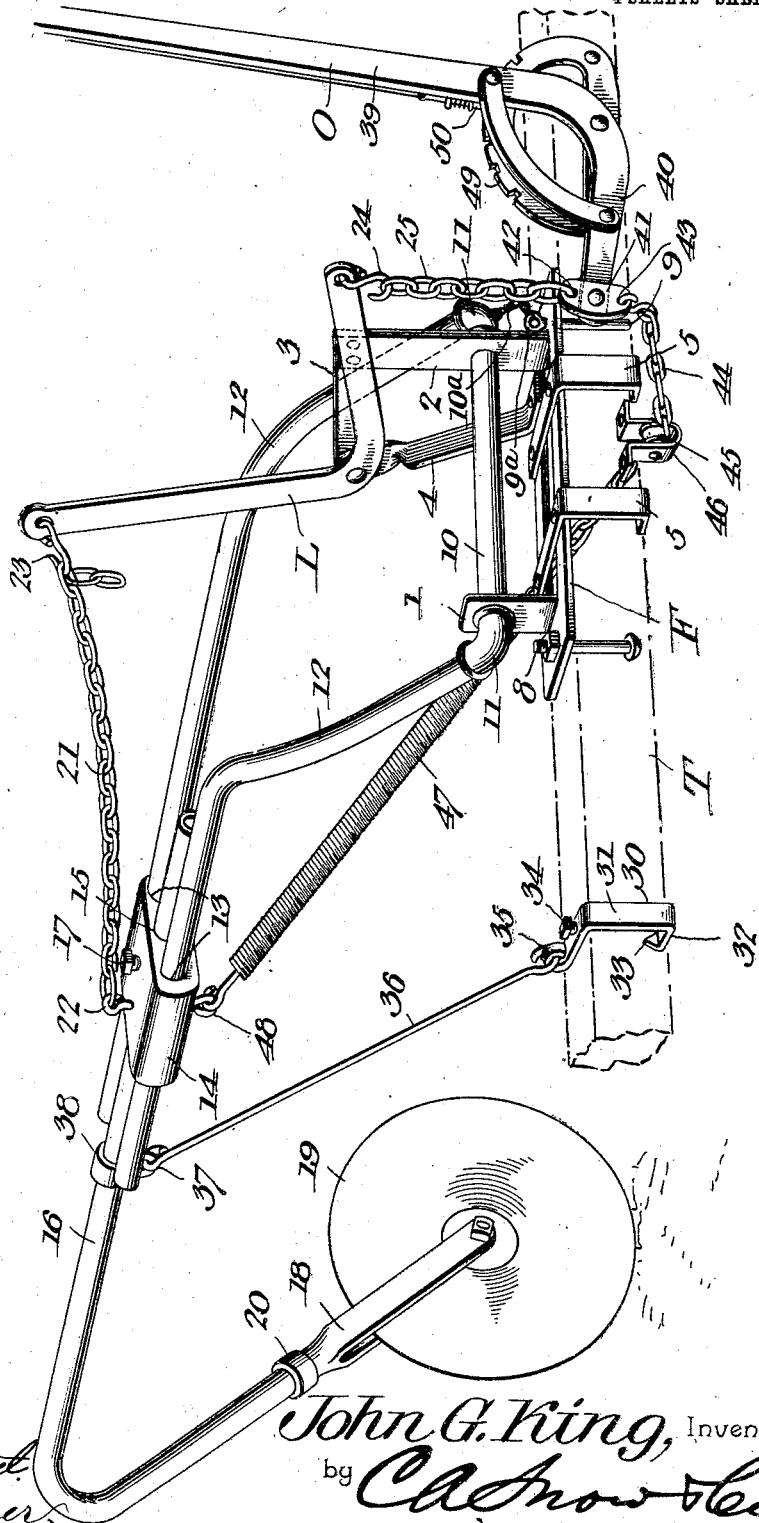

No. 785,173. PATENTED MAR. 21, 1905.
J. G. KING.
VINE CUTTING ATTACHMENT FOR MOWING MACHINES.
APPLICATION FILED AUG. 6, 1904.

4 SHEETS—SHEET 4.

Witnesses

John G. King, Inventor.
by C. A. Snow & Co.
Attorneys

No. 785,173. Patented March 21, 1905.

UNITED STATES PATENT OFFICE.

JOHN GRANVILL KING, OF PINE BLUFF, ARKANSAS.

VINE-CUTTING ATTACHMENT FOR MOWING-MACHINES.

SPECIFICATION forming part of Letters Patent No. 785,173, dated March 21, 1905.

Application filed August 6, 1904. Serial No. 219,762.

*To all whom it may concern:*

Be it known that I, JOHN GRANVILL KING, a citizen of the United States, residing at Pine Bluff, in the county of Jefferson and State of Arkansas, have invented a new and useful Vine-Cutting Attachment for Mowing-Machines, of which the following is a specification.

This invention relates to vine-cutting attachments for mowing-machines, and it has particular reference to attachments for that class of mowing-machines which are provided with what is conventionally known as a "front" cutter-bar.

When vines, such as pea-vines, are extensively raised for fodder or other purposes, it is found practically impossible to cut the tangled and matted mass of growth with a mowing-machine of ordinary construction, for the obvious reason that the swath will not be separated from the adjacent standing vines and will become dragged or torn along by the cutter-bar of the machine until the progress of the latter is obstructed. This applies to tangled or matted growths of all kinds. Complicated machines have been devised for the sole purpose of cutting such vines or matted and tangled growths; but the object of my present invention is to provide a device in the nature of an attachment capable of being readily applied to or detached from any ordinary mowing-machine having a front cutter-bar, which said attachment shall be capable of being produced at a moderate expense and by means of which the swath cut by the machine shall be completely sheared or separated from the adjacent standing vines, so that the harvesting of such crops may be proceeded with in an entirely successful manner.

With this and other ends in view, which will readily appear as the nature of the invention is better understood, the same consists in the improved construction and novel arrangement and combination of parts which will be hereinafter fully described, and particularly pointed out in the claims.

In the accompanying drawings has been illustrated a simple and preferred form of embodiment of the invention, it being, however, understood that no limitation is necessarily made to the precise structural details therein exhibited, but that the right is reserved to any changes, alterations, and modifications to which recourse may be had within the scope of the invention and without departing from the spirit or sacrificing the efficiency of the same.

Figure 2:
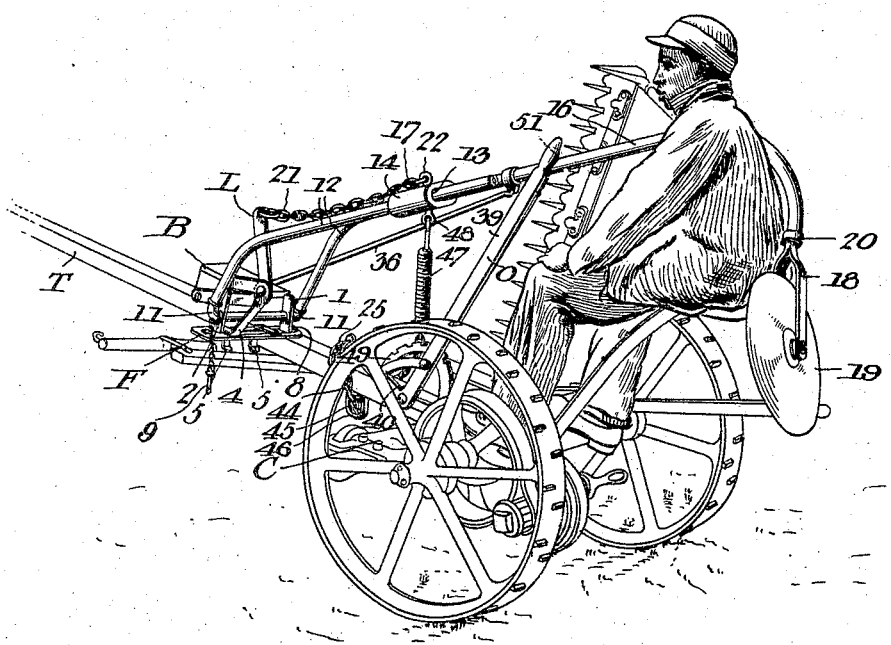
Figure 4:
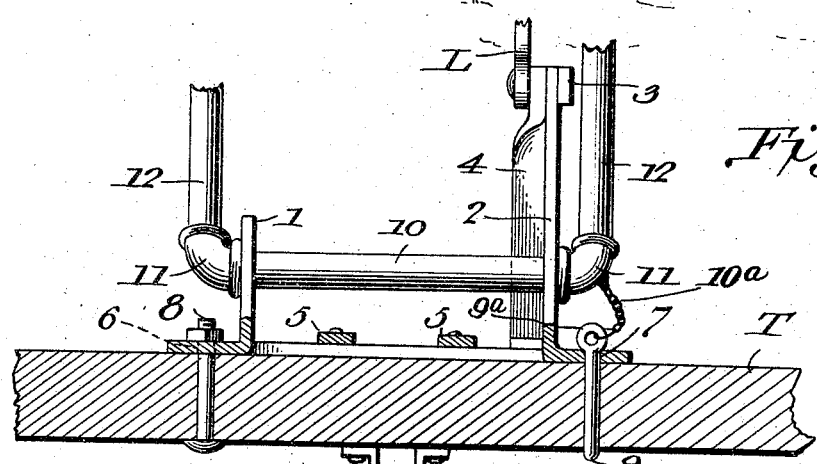
Figure 5:
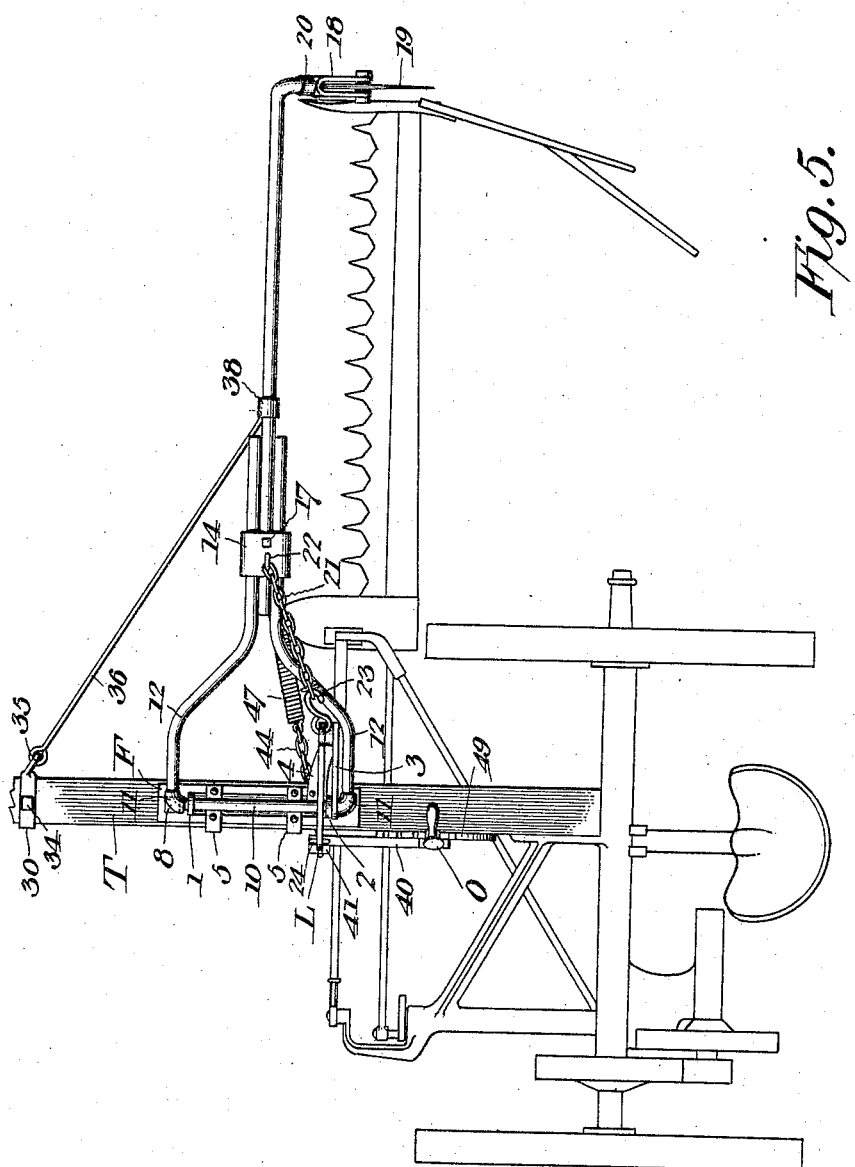

In said drawings, Figure 1 is a perspective view of an ordinary conventional mowing-machine, showing the improved vine-cutting attachment applied thereto and in position for operation, dotted lines being used to indicate the position of the vine-cutting attachment when temporarily thrown out of operation. Fig. 2 is a similar perspective view illustrating the position of the vine-cutting attachment while out of operation for transportation upon the mowing-machine with which it is connected. Fig. 3 is a perspective view showing the vine-cutting attachment detached from the mowing-machine, the several parts being properly assembled with relation to each other. Fig. 4 is a sectional detail view. Fig. 5 is a diagrammatic plan view showing the invention applied to a mowing-machine of ordinary construction.

Corresponding parts in the several figures are indicated by similar characters of reference.

My invention includes a base or frame F, which is provided near its front and rear ends with upwardly-extending brackets 1 and 2, the rear bracket being provided with a lateral arm or offset 3, the outer end of which is connected with the frame by a brace 4. The frame is provided at one side thereof with downwardly-extending hook members 5 5, adapted to abut upon the side of the tongue T of a mowing-machine M, with which my improved attachment in Figs. 1 and 2 of the drawings is shown as being connected for operation. The plate or frame F is provided near its front and rear ends with perforations 6 and 7, the former being for the passage of a bolt 8, by means of which said plate or frame is secured upon the tongue T. The perforation 7 is for the passage of a drop-pin 9, which, while it serves in conjunction with the bolt 8 to hold the frame F securely in position upon the tongue, may be readily detached, so as to enable the said frame to swing upon the bolt 8 to a position approximately at right angles to the tongue. The location of the plate or frame F, as will be seen by reference to Figs. 1 and 2, is in rear of the tool-box B, which is usually supported upon the tongue of this class of machines and in front of the driver—in other words, in approximate alinement with the cutter-bar C of the machine, to which the device is attached.

The brackets 1 and 2 constitute bearings for a rock-shaft 10, which preferably consists of a tube, such as a gas-pipe of proper dimensions, said tubular shaft being provided adjacent to the outer sides of the brackets 1 2 with elbows 11, whereby it is connected with suitably-curved tubular members 12, which converge in the direction of each other and are secured in the bores 13 of a connecting-block 14. The latter is provided with a central bore 15, in which a tubular extension-bar 16 is adjustably secured, as by means of a set-screw 17. The connection of the members 12 with the connecting-block 14 may likewise be adjustable, if desired, thereby increasing the scope of adjustment of the members 12, 12, and 16, connected by the block 13. The extension member 16 is downwardly curved at its outer end and has connected therewith a bifurcated bracket 18, in the fork of which is journaled a circular sharp-edged disk constituting a cutter 19. The bifurcated bracket is connected with the downturned end of the member 16 by means of a coupling-nut or interiorly-threaded sleeve 20.

Fulcrumed upon the arm 3 of the bracket 2 is a bell-crank lever L, the upwardly-extending arm of which is connected, by means of a chain or flexible connecting element 21, with the connecting-block 14, the upper side of which is shown as being provided with an eye 22, whereby such connection may be readily effected. The chain 21 is preferably connected with a hook 23 at the upper end of the lever L, thus enabling said chain to be lengthened or shortened according to present requirements. The lower arm of the bell-crank lever L is provided at its outer end with a hook 24, having connection by means of a chain 25 with the operating-lever, which will be presently described.

30 designates a clamp which is in the nature of a hook, having a long arm 31 and a short arm 32, the latter being provided with an inturned prong 33 and the former being provided with a set-screw 34. This clamp is adapted for adjustment upon the tongue T at a point in advance of the frame F, said clamp being secured detachably in any desired position by adjusting it against the under side of the tongue and then tightening the set-screw 34. The upper end of the long arm of the clamp terminates in an eye 35, which is connected by a brace-rod 36 with an eye 37 upon a collar 38, which is mounted upon the extension member 16, carrying the rotary cutting-disk. While I do not wish to be understood as limiting myself to this precise form of brace, it is obvious that a brace of this character is important in order to enable the cutting mechanism to resist the rearward stress and strain to which in operation it will be subjected.

Pivotally connected with the tongue T in rear of the frame F is an operating-lever O, which is in the nature of a bell-crank lever having a long upwardly-extending arm 39 and a short forwardly-extending arm 40. The latter is provided near its forward extremity with a cross-piece 41, having perforations 42 and 43, the upper one of which is connected adjustably by means of the chain 25 with the hook 24, connected with the lower arm of the bell-crank lever L, which, it will be seen, is supported in a plane above the fulcrum of the operating-lever. With the lower perforation 43 in the cross-piece at the end of the arm 40 is connected a chain 44, which is guided over a pulley 45, journaled in a bracket 46, which is secured to the under side of the tongue, the chain 44 being connected with the lower end of a helical tension-spring 47, the upper end of which is connected with the under side of the block 14, which for this purpose is provided with an eye 48.

Connected with the tongue T, concentrically with the fulcrum of the operating-lever O, is a segment-rack 49, adapted to be engaged by a spring-actuated dog or pawl 50, which is connected with the flat side of the arm 39 of the operating-lever, said dog being operated in the usual manner by means of a handle 51, which is spaced from the upper extremity of the arm 39. The latter, it will be seen, coöperates with the handle member 51 to form a fork, which in this case is adapted to form a support for the cutting device of the improved vine-cutting attachment when the latter is out of operation and in position for being transported from one place to another.

The drop-pin 9, which serves in conjunction with the bolt 8 to hold the frame F in operative position on the tongue, is preferably formed with an eye 9$^a$, connected by a chain 10$^a$ with the elbow 11 at the rear end of the rock-shaft 10. The said pin when not in active use will thus be secured in a position where it will be readily available for use whenever required.

The operation and advantages of this invention will be readily understood from the foregoing description, taken in connection with the drawings hereto annexed, by those skilled in the art to which it appertains. The chain 21, which connects the upwardly-extending arm of the bell-crank lever L with the upper side of the connecting-block 14, I designate the "brace-chain." The chain 25, which connects the lower arm of the bell-crank lever with the forwardly-extending arm of the operating-lever, is the connecting-chain, and the chain 44, which connects the forwardly-extending arm of the operating-lever with the spring 47, is the tension-chain. All of these chains may be conveniently adjusted as to the length thereof, so that the parts of the device shall be caused to coöperate easily and successfully for their respective purposes. The tension of the spring 47 is exerted to force the cutter-carrying arm in a downward direction, thus holding the cutter-disk 19 to its work in such a manner that it will be free to yield in an upward direction, so as to pass without injury over small and hidden obstructions. If during the operation of the machine large obstructions, such as stumps, should be encountered, the operating-lever is manipulated to rock the lever L upon its fulcrum and to elevate the frame carrying the cutting-disk to the position shown in dotted lines in Fig. 1 of the drawings, which permits ordinary obstructions to be easily passed. The frame F, which supports the operative parts of the device with the exception of the operating-lever and the clamp 30, is normally held securely in position upon the tongue by means of the bolt 8 and the drop-pin 9. During transportation to and from the field, however, the drop-pin 9 is removed and the frame F, with its related parts, is swung outwardly to a position approximately at right angles to the tongue, such movement of the frame F being made possible by the fact that the hook members or brackets 5 5 abut upon one side of the tongue only, this being found ample for the proper securement of the device. Prior to thus swinging the base or supporting frame the operating-lever O will be manipulated to elevate the frame which carries the rotary cutter. The said cutter-carrying frame, with its extension member 16, will thus be turned into a longitudinal position with relation to the mowing-machine, to the tongue of which the device is attached, while the operating-lever O maintains its original position. The member 16 is then elevated into the fork formed by the upper end of the arm 39 and the latch member 51 and is there securely supported while the device is being transported, the position of the disk being directly in rear of the driver. The adjusting of the device to its position for transportation will necessitate the detachment from the tongue of the clamping member 30, which is readily effected by simply loosening the set-screw 34.

As will be seen, this improved mowing-machine attachment is simple in construction, easily applied, and is operated absolutely independently of the mowing-machine to which it is attached. This is an extremely important feature of my invention, inasmuch as it enables the improved attachment to be attached to almost every kind or make of mowing-machine, the means for its attachment consisting of only a few screws and bolts, and there being absolutely no connection of the operative parts of the improved attachment with the operative parts of the mowing-machine. The attachment requires to be made in one size only, the extension member 16, carrying the rotary cutting device, being capable of adjustment to a cutter-bar of any length usually employed. The general construction is simple and inexpensive and the operation of the device has been proven by practical tests to be eminently successful.

Having thus described the invention, what is claimed is—

1. The combination with a mowing-machine, of a vine-cutting device mounted upon the tongue of the machine and including a rotary cutting-disk, and means for supporting said disk adjacent to the end of the cutter-bar of the machine.

2. The combination with a mowing-machine, of a vine-cutting device mounted upon the tongue of the machine and including a base-plate, means for pivotally supporting said base-plate, means for securing said base-plate against pivotal movement, a rotary cutting-disk, and means for supporting said disk in position for operation.

3. The combination with a mowing-machine, of a vine-cutting device mounted upon the tongue of the machine and including a base-plate, a pivotal bolt for said base-plate, means for securing said base-plate against pivotal movement, a rotary cutter, means for holding the cutter in operative engagement with the ground, and means for raising the cutter from its operative position.

4. The combination with a mowing-machine, of a vine-cutting device mounted upon the tongue of the machine and including a base-plate, means for pivotally supporting said base-plate, means for securing said base-plate against pivotal movement, a rotary cutter, and spring means for holding the cutter in operative engagement with the ground.

5. The combination with a mowing-machine, of a vine-cutting device mounted upon the tongue of the machine and including a base-plate, means for pivotally supporting said base-plate, means for securing said base-plate against pivotal movement, a spring-actuated frame hingedly connected with said base-plate, a rotary cutter supported by the frame, and means for manipulating said frame.

6. A vine-cutting attachment for mowing-machines including a base, a frame hingedly connected with said base, a rotary cutter supported by said frame, brackets depending from one side of the base, a pivotal bolt for one end of said base, and readily-detachable means for the securement of the opposite end of said base in operative position.

7. In a device of the class described, a base having upward-extending brackets, a rock-shaft journaled in said brackets, curved converging members connected with said rock-shaft, a block connecting the free ends of said curved members, an extension-arm supported adjustably in said block, and a rotary cutting-disk supported at the free end of said extension-arm.

8. In a device of the class described, a base, a bolt constituting a pivot for said base, means for securing said base against pivotal movement, a cutter-carrying frame connected hingedly with said base, a bell-crank lever fulcrumed upon the base, connecting means between one arm of said bell-crank lever and the cutter-carrying frame, and means for manipulating said bell-crank lever and for securing it in adjusted position.

9. In a device of the class described, a base-plate, means for pivotally supporting said base-plate, means for securing said base-plate against pivotal movement, a cutter-carrying frame hingedly connected with said base-plate, a bell-crank lever pivotally connected with a bracket extending upwardly from the base-plate, connecting means between said bell-crank lever and the upper side of the cutter-carrying frame, spring means exerting downward tension upon said cutter-carrying frame, and means for manipulating and adjusting the bell-crank lever.

10. In a device of the class described, a base-plate, means for pivotally supporting said base-plate, means for securing said base-plate against pivotal movement, a frame hingedly connected with said base-plate, a rotary cutting-disk carried by said frame, and means for effecting the upward and downward adjustment of the cutter-carrying frame, said means including a spring movable with the frame and capable of exerting a downward tension upon the latter.

11. In a device of the class described, a hingedly-mounted frame, a rotary cutting-disk carried by said frame, a bell-crank lever fixedly supported with relation to the hinged frame, an operating-lever having an arm or bell-crank, flexible connecting means between the upper arm of the bell-crank lever and the upper side of the cutter-carrying frame, flexible connecting means between the lower arm of the bell-crank lever and the bell-crank-operating lever, and flexible connecting means including a tension-spring, between the bell-crank-operating lever and the under side of the cutter-carrying frame.

12. In a device of the class described, a pivotally-supported base, a cutter-carrying frame hingedly connected with said base, a bell-crank lever pivotally connected with a bracket extending upwardly from said base, an operating-lever supported independently of the pivotally-supported base and having a bell-crank, flexible connecting means between the said bell-crank and the lower end of the bell-crank lever supported upon the base, flexible connecting means between the bell-crank supported upon the base and the upper side of the cutter-carrying frame, a tension-spring connected with the under side of the cutter-carrying frame, suitably-guided flexible connecting means between the lower end of said spring and the bell-crank-operating lever, and means upon the operating-lever for supporting the cutter-carrying frame when the base supporting the same is swung into inoperative position.

13. In a device of the class described, the combination with a mowing-machine, of a base-frame connected pivotally with the tongue of said mowing-machine, a bolt constituting such pivotal connection, readily-detachable means for retaining the base-frame securely in position for operation, a cutter-carrying frame hingedly connected with said base, a clamp mounted adjustably at a point distant from, but in alinement with the base-frame, and a brace connecting said clamp with the hingedly-mounted cutter-carrying frame.

14. In a vine-cutting attachment for mowing-machines, a cutter-carrying frame, a pivotally-supported base-frame supporting said cutter-carrying frame, readily-detachable means for securing the base-frame in position for operation, an operating-lever having a spring-actuated dog and a handle for operating the latter, a segment-rack engaged by said dog, and connecting means between the operating-lever and the cutter-carrying frame, whereby the latter may be adjusted, said operating-lever and dog-operating handle affording a support for the cutter-carrying frame when the latter is in inoperative position.

15. The combination with the tongue of a mowing-machine, of a hingedly-mounted cutter-carrying frame, a suitably-supported bell-crank lever, an operating-lever having a bell-crank, a tension-spring connected with the under side of the cutter-carrying frame, a guide-pulley upon the under side of the tongue, a flexible member guided over said pulley and connecting the lower end of the spring with the bell-crank of the operating-lever, flexible connecting means between said bell-crank and the lower arm of the bell-crank lever, and flexible connecting means between the upper end of said bell-crank lever and the upper side of the cutter-carrying frame.

16. In a device of the class described, a base-plate, vine-cutting mechanism carried by said plate, a pivotal bolt for said base-plate, tongue-engaging hooks depending from the latter, and a drop-pin adapted to engage a perforation in the base-plate.

17. In a device of the class described, a base-plate, vine-cutting mechanism carried by said plate, a pivotal bolt for said base-plate, tongue-engaging hooks depending from the latter, a drop-pin adapted to engage a perforation in the base-plate, and flexible connecting means between said drop-pin and a fixed part of the cutting mechanism.

In testimony that I claim the foregoing as my own I have hereto affixed my signature in to the presence of two witnesses.

JOHN GRANVILL KING.

Witnesses:
  J. H. HUDSON,
  G. BREWSTER.